United States Patent [19]

Spisak

[11] 4,049,234
[45] Sept. 20, 1977

[54] SAFETY COCK

[75] Inventor: John A. Spisak, Avon, Ohio

[73] Assignee: The Pipe Line Development Co., Cleveland, Ohio

[21] Appl. No.: 603,644

[22] Filed: Aug. 11, 1975

[51] Int. Cl.² .................. F16K 5/04; F16K 51/00
[52] U.S. Cl. ........................... 251/149.9; 285/325
[58] Field of Search .................. 251/149.9, 89.5; 137/614.06; 285/325

[56] References Cited

U.S. PATENT DOCUMENTS

| | | | |
|---|---|---|---|
| 83,118 | 10/1868 | Yeaton | 251/149.9 |
| 477,125 | 6/1892 | Johnson et al. | 251/149.9 |
| 1,989,079 | 1/1935 | Bucknam | 285/325 X |
| 2,265,268 | 12/1941 | Culligan | 285/325 |
| 2,320,780 | 6/1943 | Jennings et al. | 285/325 X |
| 3,991,997 | 11/1976 | Barber | 251/309 X |

FOREIGN PATENT DOCUMENTS

| | | | |
|---|---|---|---|
| 84,757 | 4/1958 | Denmark | 251/149.9 |
| 745,534 | 2/1933 | France | 285/325 |

Primary Examiner—William R. Cline
Attorney, Agent, or Firm—McNenny, Pearne, Gordon, Gail, Dickinson & Schiller

[57] ABSTRACT

A safety cock for positively maintaining a coupled connection between a fluid delivery conduit and a chamber during fluid delivery to the chamber and for permitting the conduit to be uncoupled when fluid delivery is disestablished. The safety cock comprises a block having a valved passageway therethrough. A handle projects from the valve and prevents uncoupling of the fluid delivery conduit when the valve opens the passageway by blocking the conduit removal path, but permits uncoupling when the valve closes the passageway.

3 Claims, 4 Drawing Figures

SAFETY COCK

BACKGROUND OF THE INVENTION

This invention relates to safety cocks and, more particularly, to safety cocks which are intended to couple a fluid delivery conduit to a chamber. Such safety cocks have particular utility in pipe repair rings were sealant is injected under pressure to a confined chamber defined by the ring to seal off a pipe leak. An example of such a repair ring is shown in U.s. Pat. No. 3,467,141 (the disclosure of which is incorporated herein by reference) and includes an arrangement for sealing off leaks in pipes between abutting flanges which may be applied on site to a leaking pipe without shutting off the flow within the pipe while repairs are being made. The patented invention provides a mechanical sealing means for initially blocked off a circumferential zone where bolted, flanged pipes are abutted and which will permit the introduction of a suitable fluid sealant under pressure within that zone so that any further fluid leakage through the zone defined by each bolt and bolt hole will carry the sealant therethrough to effectively seal the leaking joint. According to the teachings of that patent, semicylindrical sections having a gasketed inner face are applied to the flanges to fence off an area at the flanged joint. The sealant is introduced through fittings which comprise one-way check valves similar to conventional grease fittings. A globe valve is provided to permit excess pressure to be relieved during the sealing operation and that valve is later removed and replaced with a check valve fitting.

While the above-described arrangement is suitable for many sealing applications, there are certain disadvantages in the use of check valve fittings. One such disadvantage is that care must be exercised in maintaining a coupled connection between a high-pressure fluid delivery conduit and the fittings, since the repair man would be subjected to high-pressure sealant and/or fluid pressure from the pipeline if the conduit should become disconnected from its fitting. Furthermore, for many sealing operations, coarse fillers are required in the sealant, such as asbestos shreds, steel wool, or metal particles. Those fillers tend to foul the ball check valve and/or cause the check valve to be wedged open after the conduit is disconnected so that the fitting leaks. Although the leakage of sealant is not particularly hazardous, there exists the possibility of pressurized fluids, such as live steam, leaking through the fitting from the pipeline. A still further disadvantage in the prior art fittings is that those fittings are frequently associated with high temperature pipelines and heat tends to weaken the ball check valve spring, particularly if temperature cycling is involved.

A still further problem with prior art repair ring fittings is that after prolonged use of the repair ring, voids may be formed in the encased sealant by the high pressure fluid from the pipeline. If the sealant is still soft in the vicinity of a fitting adjacent the void, more sealant may be added through that fitting. However, the sealant adjacent and within the fitting is frequently in a solidified state, since that sealant is adjacent cooler repair ring portions, such that with prior art fittings new sealant cannot be readily introduced into the repair ring.

SUMMARY OF THE INVENTION

This invention overcomes many of the above-noted prior art problems by providing a safety cock fitting for positively maintining a coupled connection between a fluid delivery conduit and a chamber during fluid delivery to the chamber and for permitting the conduit to be uncoupled when fluid delivery is disestablished. The safety cock according to this invention comprises a block having a valve passageway therethrough. A handle projects from the valve and prevents uncoupling of the fluid delivery conduit when the valve opens the passageway by blocking the conduit removal path, but permits uncoupling when the valve closes the passageway. More specifically, the invention provides a safety cock which includes a block adapted to be connected to a chamber such as a chamber defined by a pipeline repair ring. A passageway is provided through the block and a valve is provided in the passageway for alternately opening and closing the passageway. The valve includes a cylindrical shaft within a bore in the block which intersects the passageway. The shaft itself has a transverse bore therethrough which is adapted to communicate with the passageway when the shaft is in a first rotative position and is adapted to be offset from the passageway when the shaft is in a second rotative position so that the passageway is blocked by the shaft. There is provided at one end of the block a projecting nipple having a planar face at which one end of the passageway terminates. A groove is provided in the nipple and extends transversely with respect to the axis of the passageway so that a fluid delivery conduit may be coupled to the block. A handle is connected to the shaft for rotating the shaft between the first and second rotative positions. The handle intersects a plane defined by the planar face when the shaft is in its first rotative position and clears the plane when the shaft is in its second rotative position, so that the fluid delivery conduit is locked in place when the valve is open and so that the fluid delivery conduit may be removed from the nipple when the valve is closed. This arrangement ensures that the fluid delivery conduit will not be accidentally dislodged from the safety cock when the safety cock is open, but permits simple removal of the fluid delivery conduit from the safety cock when the safety cock is closed. Moreover, the safety cock according to this invention provides a straight line passageway to the chamber sealed by the repair ring when the safety cock is open, thus permitting any hardened sealant to be drilled. After the drill is removed, the safety cock would be closed immediately to prevent any pressurized fluid from escaping. Thereafter, fresh sealant may be introduced to the chamber.

The safety cock according to this invention may be employed as a relief valve to convey pressurized fluid from the chamber as sealant is introduced to other safety cocks. That is to say, the safety cock according to this invention may be substituted for the relief valve 45 of U.S. Pat. No. 3,467,141.

DETAILED DESCRIPTION OF THE INVENTION

Figure 1:
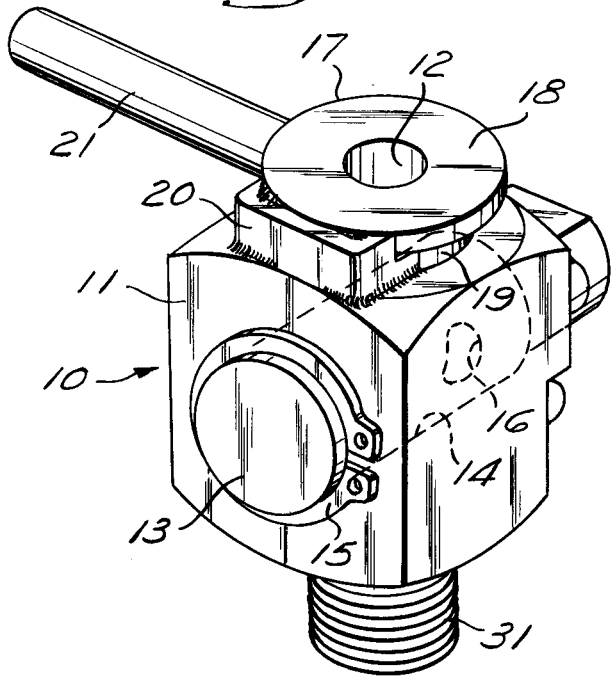
FIG. 1 is a perspective view of a safety cock according to this invention.
Figure 2:
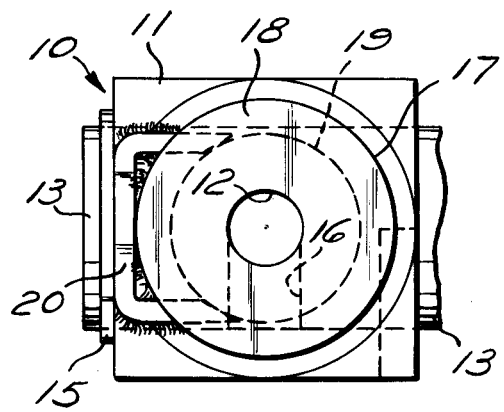
FIG. 2 is a fragmentary, plan view of the device illustrated in FIG. 1.

Referring now to the drawing, there is illustrated a safety cock 10. The safety cock 10 includes a block 11 having an axial passageway 12 therethrough. There is included a valve in the passageway for alternately opening and closing the passageway 12 and the valve includes a cylindrical shaft 13 rotatably mounted within a transverse bore 14 in the block 11. Close tolerances are maintained between the shaft 13 and the bore 14 so that a precision fit is attained. The shaft 13 is constrained against axial movement by a C-ring 15. The shaft is provided with a transverse bore 16 communicating with the passageway 12 along a straight line when the shaft 13 is in a first rotative position and is adapted to be offset from the passageway when the shaft is in a second rotative position so that the passageway is blocked by the shaft. The second rotative position is illustrated in FIG. 1.

There is provided a projecting nipple 17 on the block and the nipple includes a planar face 18 at which one end of the passageway 12 terminates. The nipple 17 is provided with an undercut or groove 19 which is partially blocked by an insert 20 welded to the base 11 so that the groove 19 extends around the nipple less than 360°, and preferably 180°. The block 11 is adapted to be mounted on a repair ring or other body by means of an integral nipple 31 formed with external pipe threads and through which the passageway 12 extends.

Figure 3:
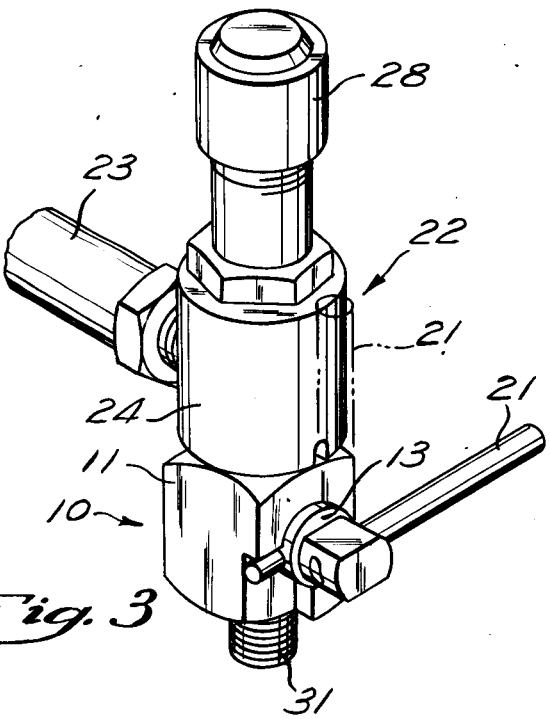
FIG. 3 is a perspective view of the safety cock, showing a fluid pressure delivery conduit attached thereto.
Figure 4:
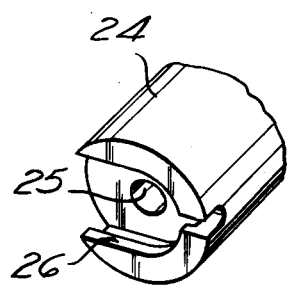
FIG. 4 is a fragmentary, perspective view of the end of the conduit fitting which attaches to the safety cock.

The passageway 12 may be opened and closed by swinging a handle 21 attached to the shaft 13 from its illustrated solid outline position to the position illustrated in phantom outline in FIG. 3, to thereby align the transverse bore 16 with the passageway 12. As is illustrated in FIGS. 3 and 4, a fluid delivery conduit system 22 of known contruction may be attached to the nipple 18 when the handle 21, and therefore the shaft 13, are in a closed position, with the handle lying in a nonintersecting position with respect to a plane passing through the surface 18. With the handle in this position, and therefore with the valve closed, the assembly 22 may be slipped over the nipple and assume the position shown in FIG. 3. The assembly 22 includes a fluid delivery hose 23 for delivering sealant under pressure to an axial bore 25 which is adapted to communicate with the passageway 12 when the assembly 22 is attached thereto. As may be seen in FIG. 4, the cylinder 24 has a U-shaped, overhanging lip 26 which slips into the groove 19 to thereby prevent axial removal of the assembly 22. Rotation of the assembly 22 relative to the block 11 is prevented by the insert 20.

After the cylinder 24 is slipped onto the nipple 17, the valve may be opened by rotating the handle 21 to its phantom outline position in FIG. 3. With the handle in this position, the assembly 22 may not be removed from the block 11, since such removal would be blocked by the handle 21. Although the close tolerances between the bore 14 and the cylinder 13 tend to maintain the handle 21 in its rotated position, a detent (not shown) may be provided to positively lock the handle in place. Such a detent may be provided either on the block 11 or on the cylinder 24. The assembly 22 is further provided with a relief valve 28 to relieve excess pressure.

The safety cock 10 may be employed as a fitting in a repair ring, such as a repair ring set forth in U.S. Pat. No. 3,467,141. As may be appreciated, the safety cock 10 may be employed as a substitute for the fittings 47 and/or it may be employed as a substitute for the globe valve 45 of that patent.

Although preferred embodiments of this invention are illustrated, it is to be understood that various other modifications and rearrangements of parts may be resorted to without departing from the scope of the invention claimed herein.

What is claimed is:

1. A safety cock for positively maintaining a coupled connection between a fluid delivery conduit and a chamber during fluid delivery to the chamber and for permitting said conduit to be uncoupled when fluid delivery is disestablished, comprising a block adapted to be connected to a chamber, a passageway through and defined by said block, a valve in said passageway for alternately opening and closing said passageway, said valve comprising a cylindrical shaft within a bore in said block and intersecting said passageway, said shaft having a transverse bore therethrough adapted to communicate with said passageway when said shaft is in a first rotative position and adapted to be offset from said passageway when such shaft is in a second rotative position so that said passageway is blocked by said shaft, a projecting nipple having a planar face at which one end of said passageway terminates, groove means in said nipple extending transversely with respect to the axis of said passageway for laterally receiving and coupling said conduit to said block, said groove means including portions on diametrically opposite sides of said axis whereby said groove means is capable of solely preventing axial separation of said conduit from said nipple, a handle connected to said shaft for rotating said shaft between first and second rotative positions, said handle intersecting a plane defined by said planar face when said shaft is in its first rotative position and clearing said plane when said shaft is in its second rotative position.

2. A safety cock for positively maintaining connection between a fluid delivery conduit and a chamber and for alternately establishing and terminating fluid communication between the conduit and the chamber, comprising a body having a passageway defining an axis, the outer portion of the passageway being formed by a nipple integral with the body, the outermost portion of the nipple terminating at a planar face perpendicular to the passageway axis and intercepted by said passage, valve means in said passageway for alternately opening and closing said passageway, said valve means including an element rotatably mounted in a bore in said body transverse to said passageway axis between open and closed positions, a handle external of said body fixed to said rotatable valve element for selectively moving it between said open and closed positions, external groove means on said nipple spaced from and parallel to said planar face, said groove means being arranged on said nipple to include portions disposed on diametrically opposite sides of the passageway axis, means limiting the effective extent of the groove means to less than 360° about the periphery of the nipple whereby said groove means is adapted to receive a fluid delivery element laterally relative to the passageway axis from the side of the nipple opposite said groove limiting means and whereby said groove is capable of solely retaining the delivery element against axial separation, said handle being arranged relative to said valve element and said body such that said handle is displaced from the plane of said face of said nipple when said valve element is in its closed position, said handle intercepting said plane at a point generally diametrically opposed to said groove limiting means when said valve element is in its open position whereby it is adapted to prevent lateral movement of the fluid delivery element from the nipple groove means.

3. A safety cock according to claim 2, wherein said valve element comprises a cylindrical shaft within said transverse bore, said shaft having a cross bore therethrough adapted to communicate with said passageway when said shaft is in said open position and adapted to be offset from said passageway when said shaft is in said closed position, said bore having a cross section at least generally equal to that of said passageway, said passageway and said cross bore defining a straight-through passage when said shaft is in said open position.

* * * * *